July 14, 1942. W. F. GROSSENBACH 2,289,647
ANCHOR FOR DECOY DUCKS
Filed Oct. 30, 1941
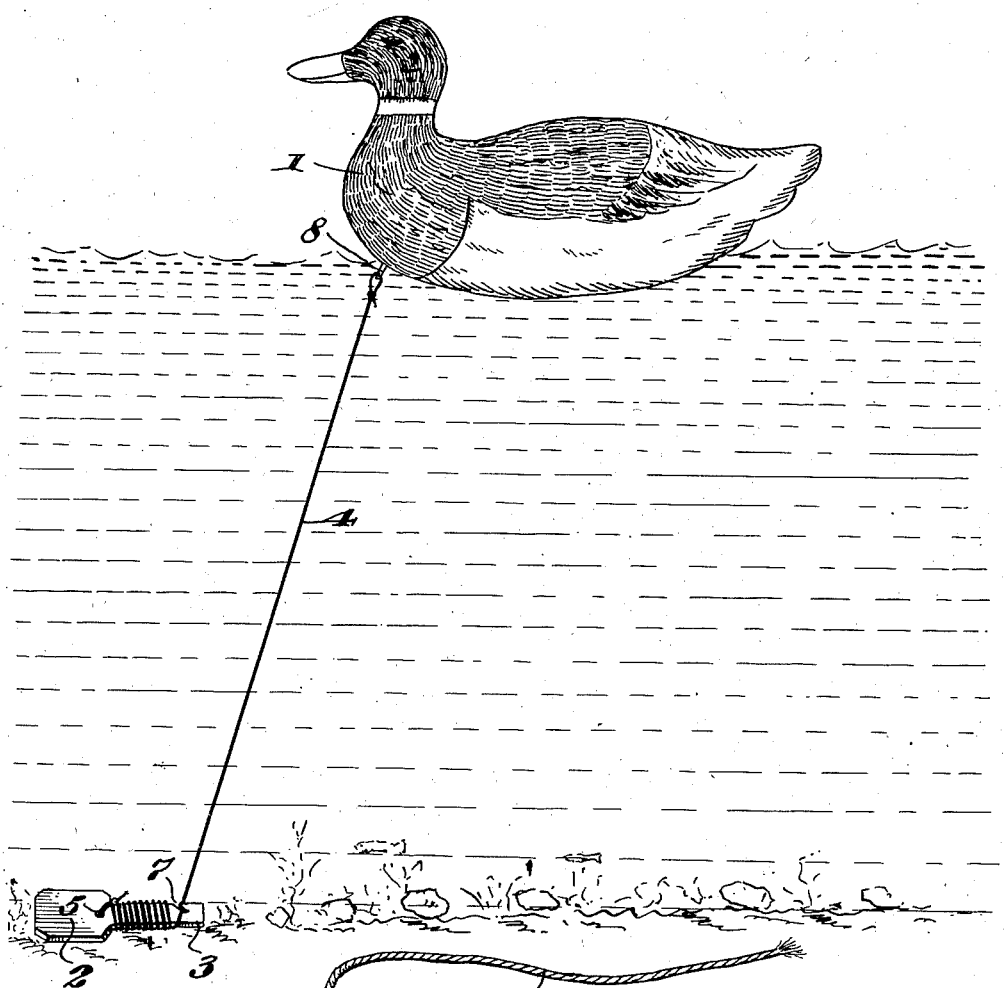
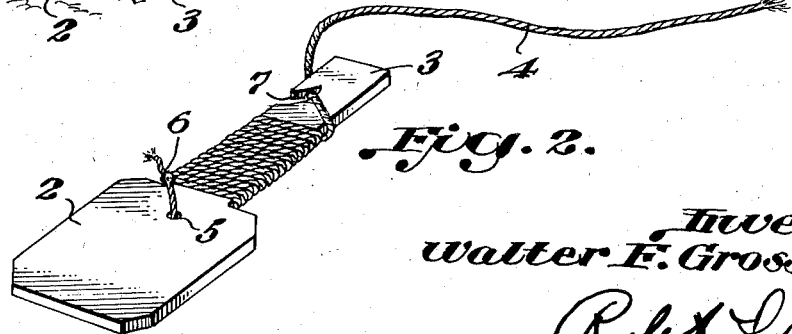
Inventor,
Walter F. Grossenbach
By Robert C. Dennison
Atty.

Patented July 14, 1942

2,289,647

UNITED STATES PATENT OFFICE 2,289,647

ANCHOR FOR DECOY DUCKS

Walter F. Grossenbach, Ogden, Utah

Application October 30, 1941, Serial No. 417,191

2 Claims. (Cl. 43—3)

The present invention relates to improvements in anchoring devices for decoy ducks.

One of the important objects of the present invention resides in the provision of means for anchoring the decoy in any depth of water and which anchoring means will not be readily dislodged or cause entanglement of the line which connects the anchor to the decoy.

A still further object of the invention is to provide an anchoring means wherein the anchor includes a shank portion around which the line or cord may be wound, there being means associated with the shank to lock the cord after it has been let out the desired length, thus producing an efficient drag in the mud or silt commonly found at the bottom of a body of water.

Another important object resides in the provision of an anchor which, due to its simplicity, can be manufactured at a very low cost and which when not in use will occupy a minimum amount of space.

Other objects and advantages will become apparent from the following description when taken in conjunction with the accompanying drawing.

In the accompanying drawing, I have illustrated one embodiment of my invention incorporating the novel features of construction and wherein:

Figure 1 is a perspective view of a decoy in position in the water with my novel anchoring device attached thereto; and Figure 2 is an enlarged detailed perspective view of the anchor showing the attaching line wound around the shank with the line locked in the retaining slot provided therefor in the shank.

In the drawing, wherein, for the purpose of illustration, is shown the preferred embodiment of my invention, the numeral 1 designates a conventional decoy duck.

My improved anchor includes a weighted body 2 which in the present instance is in the shape of a rectangular heavy plate formed of any suitable material. While the body is shown as being flat and rectangular, it is to be understood that the same may be of any desired shape and I do not wish to limit myself to any particular design of the weighted body.

Formed integrally with the plate-like body and extending laterally from one end thereof is the elongated flat shank 3, around which the attaching line or cord 4 is adapted to be wound in a manner to be presently described. The shank is of the same thickness as the plate-like body.

One end of the line is passed through a suitable opening 5 provided in the plate-like body adjacent the shank 3 and is knotted as shown at 6 to prevent disengagement of the line from the plate-like body 2.

The other end of the line 4 is adapted to be attached to a screw eye or the like indicated at 8 in Figure 1, that is arranged on the underside of the decoy, so that the attaching line will not appear above the surface of the water.

A wedge-shaped slot 7 is formed in one side edge of the shank 3 near the outer end thereof, as clearly shown in Figure 2, the purpose of which will also be presently apparent.

Since the depth of water varies in different locations, it is essential that provision be made whereby the length of the line or cord connecting the decoy to the anchor may be varied.

To accomplish this purpose, the shank 3 permits the line to be wound therearound and from which the line may be unwound when positioning the decoy on the surface of the water.

After the depth of the water has been ascertained, the portion of the line that remains wound around the shank 3 will be kept from unwinding therefrom by wedging the line disposed adjacent the slot 7 therein, in the manner illustrated in Figures 1 and 2 of the drawing.

When the line is thus fastened or locked by the wedge-shaped slot 7, and the anchor is lowered into the water, the weighted plate-like body will be at the bottom of the water in the mud or silt usually found at the bottom of a body of water. The slot 7 will prevent any accidental unwinding of the line from the shank and thereby prevent the line or cord from becoming entangled. Further, the line will act as a drag and tend to prevent the decoy from drifting.

By constructing the anchor in the manner as shown, relatively sharp corners will be formed which will tend to dig into the bottom more firmly when the device is in use, thereby holding the anchor at the point where it is lowered.

When not in use, the anchor with the line wound completely around the shank will render the device compact, and occupying a minimum of space.

While I have shown the preferred embodiment of my invention, it is to be understood that various changes in the size, shape and arrangement of parts may be resorted to without departing from the spirit of the invention and the scope of the appended claims.

Having thus described the invention, what I claim is:

1. An anchor for decoys comprising a weighted plate-like body, an attaching line having one end attached thereto, the other end of the line being connected to a decoy, an elongated shank formed integrally with the plate-like body and extending outwardly from one side edge thereof and around which the line may be wound, the outer end portion of said shank being formed with an inwardly extending slot at one side edge thereof for receiving and wedging a portion of the line therein to prevent the unwinding of the line that is wound around the shank.

2. An anchor for decoys comprising a weighted substantially rectangular plate-like body having a cord receiving opening formed therein, an elongated flat shank formed integrally with the plate-like body and extending laterally from one side edge thereof and being of the same thickness as the plate-like body, an attaching line having one end disposed through the opening in the plate-like body and knotted to prevent disengagement therefrom, the other end of the attaching line being adapted for attachment to a decoy, the intermediate portion of the line adapted to be wound around the shank, said shank being formed with a wedge-shaped slot that extends inwardly from one side edge of the shank adjacent the outer end thereof to receive and lock the adjacent portion of the line therein, thereby preventing the unwinding of the line from around the shank.

WALTER F. GROSSENBACH.